Aug. 21, 1928.

H. AUSTIN 1,681,163

SEAT FOR MOTOR CARS AND LIKE PURPOSES

Filed May 17, 1924

Herbert Austin,
By S. M. McColl,
atty.

Patented Aug. 21, 1928.

1,681,163

UNITED STATES PATENT OFFICE.

HERBERT AUSTIN, OF BROMSGROVE, ENGLAND.

SEAT FOR MOTOR CARS AND LIKE PURPOSES.

Application filed May 17, 1924, Serial No. 714,032, and in Great Britain May 18, 1923.

This invention relates more especially to front seats of motor cars, but is applicable also to other motor car seats and also to seats used for like purposes, and has for its object to provide very ready and efficient means for adjusting the position of the seats forwards and rearwards and for tilting or turning them backwards or forwards when required.

A convenient embodiment of the invention is described by reference to the drawings herewith, of which:—

Figure 1:
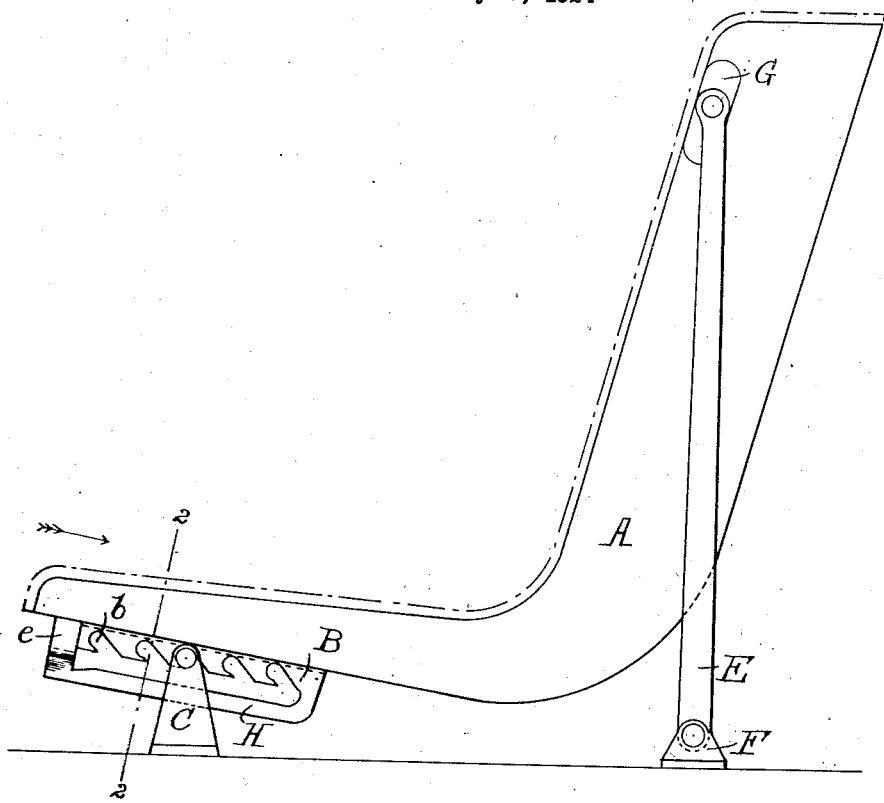
Figure 1 is a side elevation of a front seat of a motor car constructed according to this invention.
Figures 2, 3:
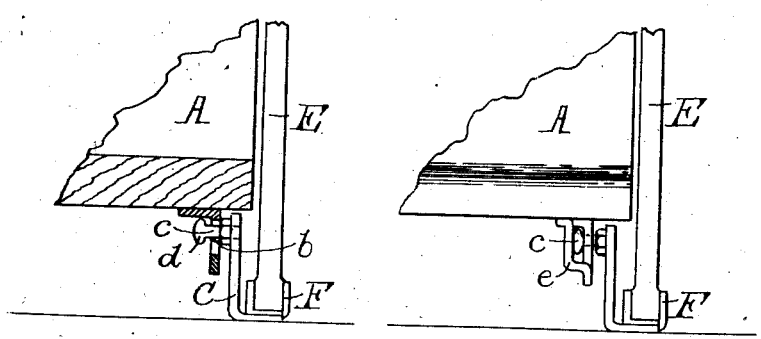
Figure 2 is a fragmentary sectional view taken on the line 2, 2, of Figure 1, and looking in the direction of the arrow of that figure; and, Figure 3 is a somewhat similar fragmentary view as seen from the front of the seat.

In these drawings A is the main body of the seat provided at each side with a plate B having a set of inclined notches $b$. C is one of a pair of standards and $c$ a sideway projection therefrom (see Figure 2) adapted to engage with one or other of the notches. The projection $c$ is provided with a head $d$ which is of a diameter slightly greater than the width of each notch so that when the projection is within a notch the head serves to secure the seat against lateral displacement. The rear of the seat is supported by a pair of struts of which one, E, is shown. Each of these struts is pivoted at its lower end to a bracket F screwed to the floor of the vehicle, and is pivoted at its upper end to a bracket G which is screwed to the corresponding side of the back of the seat at a point which is high up in relation thereto.

The plate B is provided with a rail H to guard against the seat being accidentally tilted back and the projections $c$ entirely disengaged from the respective plates. In order, however, to permit of the disengagement of each projection with its corresponding plate, when desired, the latter is pressed inwards at its forward end as clearly shown at $e$, Figure 3, for a distance sufficient to permit the head to pass out clear at the forward end of the space between the rail H and the notches $b$.

The use of a plate with slanting notches such as $b$ has already been used on certain kinds of seats and the reason for the slanting of the notches is to prevent the seat accidentally tilting back. There is, however, some likelihood of the seat tilting back and this is guarded against by the rail H. With a seat constructed as above described there is little or no tendency, when the front seat is occupied, for it to tilt due to pressure from the feet of passengers in the rear seats, because such pressure can only act to move the seat in a line which is substantially at right angles to a line joining the pivot axis on the bracket G to the respective projection $c$, because of the slant of the notches $b$, so that a large proportion of the occupant's weight has a direct effect in keeping the seat from being moved and the tendency of the occupant's weight is to press the seat back.

A seat constructed as above described can be very readily adjusted backwards or forwards simply by lifting the forward edge and causing any one of the notches of each plate to engage with the sideway projection of the corresponding standard. Furthermore the seat can be very readily moved bodily backwards or forwards simply by raising the forward edge of the seat to bring the projections $c$ into the spaces below the notches and then moving back the seat until the heads $d$ pass clear of the plates. The seat can then be tilted or moved bodily forwards or rearwards to the full extent of the length of the struts if desired. This is especially a valuable feature in cases where, as is sometimes the case, the filling hole for the petrol tank is placed under one of the seats.

Having fully described my invention, what I claim and desire to secure by Letters Patent is:—

1. A seat for a motor car or the like having a floor, said seat comprising a seat proper and a back connected to the rear of the seat proper, struts connected to the floor and pivoted to the back at the upper part thereof, a pair of standards supported on the floor adjacent the front of the seat each having an inwardly extending projection at its top, a pair of notched plates each secured to a respective side of the seat in position to have the notches engaged selectively by the said projections, each of said plates including a rail beneath the projection to limit upward movement of the seat proper relative thereto, and means to detachably hold the projections in operative relation to the plates.

2. A seat for a motor car or the like having a floor, said seat comprising a seat proper and a back rigidly connected to the rear of the seat proper, struts pivotally connected to the floor and pivoted to the back of the upper part thereof, a pair of standards supported on the floor adjacent the front of the seat each having an inwardly extending projection at its top, a pair of notched plates each secured to a respective side of the seat in position to have the notches engaged selectively by the said projections, each of said plates including a rail beneath the projection to limit upward movement of the seat proper relative thereto, and means to detachably hold the projections in operative relation to the plates.

3. A seat for a motor car or like purpose comprising a seat proper, a seat back rigid therewith, struts forming the sole support for the rear of the seat, each pivoted at its upper end to the back of the seat proper at a point which is near the top thereof and connected at its lower end to the floor of the vehicle, means for supporting the front of the seat comprising a pair of standards, an inwardly extending projection in respect of each standard, a pair of notched plates, one for each side of the seat proper, placed near the front thereof, each said projection engaging with one or other of the notches in the plate on the corresponding side, a rail beneath each notched plate to prevent the front of the seat being tilted up inadvertently, and a portion at the front of each plate pressed inwardly sufficiently to allow the corresponding projection to pass out forwards and be entirely disengaged from the plate.

4. A seat for a motor car or like purpose comprising a seat proper, a seat back rigid therewith, struts forming the sole support for the rear of the seat, each pivoted at its upper end to the back of the seat proper at a point which is near the top of the back and pivoted at its lower end to the floor of the vehicle, and means for supporting the front of the seat from the floor, said means being such as to permit of the forward edge being moved when desired.

5. A seat for a motor car or like purpose comprising a seat proper, a seat back rigid therewith, struts forming the sole support for the rear of the seat, each pivoted at its upper end to the back of the seat proper at a point which is near the top of the back and pivoted at its lower end to the floor of the vehicle, and means for supporting the front of the seat from the floor, said means being such as to permit of the front of the seat being detached therefrom to allow of its being lifted up.

6. A seat for a motor car or like purpose, comprising a seat proper, a seat back rigid therewith, a pair of struts forming the sole support for the rear of the seat, one for each side, each said strut pivoted at its upper end to the corresponding side of the back of the seat proper by a horizontal pivot axis at a point which is near the top of the back and pivoted at its lower end to the floor of the vehicle, the arrangement of the pivot axes being such that the said struts can turn in planes parallel to the direction in which the seat faces and means for supporting the front of the seat from the floor, said means being such as to permit of the forward edge being moved when desired.

7. A seat for a motor car or like purpose comprising a seat proper, a seat back rigid therewith, struts forming the sole support for the rear of the seat, each pivoted at its upper end to the back of the seat proper at a point which is near the top thereof and connected at its lower end to the floor of the vehicle, means for supporting the front of the seat comprising a pair of standards, an inwardly extending projection in respect of each standard, a pair of notched plates, one for each side of the seat proper, placed near the front thereof, each said projection engaging with one or other of the notches in the plate on the corresponding side, a rail beneath each notched plate to prevent the front of the seat being tilted up inadvertently, and a portion at the front of each plate pressed inwardly sufficiently to allow the corresponding projection to pass out forwards and be entirely disengaged from the plate.

In witness whereof I have hereunto signed my name this 28th day of February, 1924.

HERBERT AUSTIN.